US011913158B2

(12) United States Patent
Song et al.

(10) Patent No.: US 11,913,158 B2
(45) Date of Patent: Feb. 27, 2024

(54) LAUNDRY TREATMENT APPARATUS

(71) Applicant: LG Electronics Inc., Seoul (KR)

(72) Inventors: Myungjun Song, Seoul (KR); Yongjun An, Seoul (KR); Seongno Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 17/406,649

(22) Filed: Aug. 19, 2021

(65) Prior Publication Data

US 2022/0064842 A1 Mar. 3, 2022

(30) Foreign Application Priority Data

Aug. 25, 2020 (KR) .................. 10-2020-0106754

(51) Int. Cl.
*D06F 37/30* (2020.01)
*D06F 23/04* (2006.01)
*H02K 7/00* (2006.01)
*H02K 7/08* (2006.01)
*H02K 7/14* (2006.01)
*F16C 3/00* (2006.01)

(52) U.S. Cl.
CPC ............ *D06F 37/304* (2013.01); *D06F 23/04* (2013.01); *H02K 7/003* (2013.01); *H02K 7/08* (2013.01); *H02K 7/14* (2013.01); *F16C 3/00* (2013.01); *F16C 2314/00* (2013.01)

(58) Field of Classification Search
None
See application file for complete search history.

(56) References Cited

U.S. PATENT DOCUMENTS

2006/0075789 A1\* 4/2006 Lee .................. D06F 37/40
68/12.24
2017/0241063 A1\* 8/2017 Kim .................. D06F 37/40

\* cited by examiner

*Primary Examiner* — Cristi J Tate-Sims
(74) *Attorney, Agent, or Firm* — Fish & Richardson P.C.

(57) ABSTRACT

A laundry treatment apparatus includes a case, a tub configured to accommodate washing water, a drum installed inside the tub and configured to accommodate laundry, a pulsator installed inside the drum and configured to rotate by receiving driving force, and a driver configured to provide driving force for rotating the drum and the pulsator. The driver includes a driving motor including a stator and a rotor, a bearing housing installed at a lower portion of the tub, a dewatering shaft having a lower end disposed adjacent to the rotor and an upper end connected to the drum, a coupler configured to selectively connect the dewatering shaft to the rotor while lifting along an outer circumferential surface of the lower end of the dewatering shaft, a washing shaft positioned inside the dewatering shaft, and an anti-friction member inserted between the dewatering shaft and the washing shaft.

20 Claims, 10 Drawing Sheets

LAUNDRY TREATMENT APPARATUS

CROSS-REFERENCE TO RELATED APPLICATION

This application claims the benefit of Korean Patent Application No. 10-2020-0106754, filed on Aug. 25, 2020, which is hereby incorporated by reference as if fully set forth herein.

TECHNICAL FIELD

The present disclosure relates to a laundry treatment apparatus.

BACKGROUND

Generally, a laundry treatment apparatus includes a tub in which washing water is contained and a drum rotatably provided in the tub to accommodate clothes etc. (hereinafter referred to as "laundry"). As the drum rotates, washing and dewatering of laundry are performed.

The laundry treatment apparatus may be divided into a top loading type in which a rotational center of the drum is vertically formed and which is designed to be capable of introducing laundry from an upper side thereof and a front loading type in which the rotational center of the drum is horizontally formed or is slantly formed in a direction which is lowered toward a rear end and which is designed to be capable of introducing laundry from a front side thereof.

The laundry treatment apparatus of the top loading type may be broadly classified into an agitator type and a pulsator type. The agitator type performs washing by rotating a washing rod rising at the center of the drum, and the pulsator type performs washing by rotating the drum or a disc-shaped pulsator formed at a lower portion of the drum.

The front loading type is commonly referred to as a drum laundry treatment apparatus, and a lifter is provided on an inner circumferential surface of the drum and lifts and drops laundry to perform washing as the drum rotates.

Korean Patent Laid-Open No. 10-2004-0071430 (Aug. 12, 2004) (hereinafter referred to as related art) discloses a full-automatic laundry treatment apparatus of the top loading type.

The laundry treatment apparatus disclosed in the related art includes a driver including a driving motor for providing driving force, a dewatering shaft for rotating a tub, a washing shaft for driving a pulsator, and a coupler for selectively driving the dewatering shaft and the washing shaft.

The coupler transfers rotational force generated by the driving motor to the pulsator during washing and simultaneously to the pulsator and the tub during dewatering. That is, the washing shaft is always coupled to the driving motor and the dewatering shaft is selectively coupled to the driving motor. To this end, the coupler is engaged with the dewatering shaft so as to be movable up and down and includes a serration having an outer circumferential surface that may be engaged with a rotor of the driving motor. When the coupler rises, the coupler releases coupling between the dewatering shaft and the rotor and, when the coupler descends, the coupler is engaged with the rotor to transfer rotational force of the rotor to the dewatering shaft.

In the case of the laundry treatment apparatus disclosed in the related art, when the pulsator and the washing shaft alternately rotate, thrust is generated from a gear module, and collision occurs between a lifting component reciprocating in a vertical direction and a fixing component maintaining a relatively fixed state due to thrust. Then, impact noise and deformation and damage of the components occur.

In addition, even in a situation in which a product is dropped during product packaging and installation, collision between the fixing component and the lifting component occurs, impact noise is generated, and product damage and breakage occur.

SUMMARY

Accordingly, the present disclosure is directed to a laundry treatment apparatus that substantially obviates one or more problems due to limitations and disadvantages of the related art.

One of various objects of the present disclosure is to provide a laundry treatment apparatus in which a washing shaft may be firmly fixed to an inner portion of a dewatering shaft, and the rotation of a washing shaft alone may be smoothly and stably performed in a state in which the dewatering shaft is fixed.

One of various objects of the present disclosure is to provide a laundry treatment apparatus in which abrasion of a part intensively receiving load may be prevented and a fatigue life of a wave washer may be increased, while a fixing ring and a wave washer or the wave washer and an anti-friction member repeatedly contact each other.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a laundry treatment apparatus includes a case, a tub installed inside the case and configured to accommodate washing water, a drum installed inside the tub and configured to accommodate laundry, a pulsator installed inside the drum and configured to rotate by receiving driving force, and a driver configured to provide driving force for rotating the drum and the pulsator. The driver may include a driving motor including a stator and a rotor, a bearing housing installed at a lower portion of the tub, a dewatering shaft of a hollow type having a lower end disposed adjacent to the rotor and an upper end connected to the drum, a coupler configured to selectively connect the dewatering shaft to the rotor while lifting along an outer circumferential surface of the lower end of the dewatering shaft, a washing shaft which is positioned inside the dewatering shaft and has a lower end connected to the rotor and an upper end connected to the pulsator to rotate the pulsator, and an anti-friction member inserted between the dewatering shaft and the washing shaft. A fixing groove formed to be concave inward along a circumferential direction and a fixing ring having an inner circumferential surface inserted into the fixing groove and an outer circumferential surface further protruding outward than the washing shaft may be formed on an outer circumferential surface of the washing shaft. A wave washer and a washer housing for accommodating the wave washer may be provided between the anti-friction member and the fixing ring.

An outer circumferential surface of the wave washer may be covered by the washer housing.

The washer housing may include a first portion in contact with the anti-friction member, a second portion in contact with the fixing ring, and a connecting portion configured to connect the first portion and the second portion and cover the outer circumferential surface of the wave washer.

The wave washer may be accommodated in the washer housing to be in contact with the first portion, the second portion, and the connecting portion.

A first surface facing the anti-friction member of the wave washer may be partially covered by the first portion of the washer housing, and a second surface facing the fixing ring of the wave washer may be partially covered by the second portion of the washer housing.

The first portion and the second portion may include a first opening and a second opening, respectively, a portion of the first surface may be exposed to the anti-friction member by the first opening, and a portion of the second surface may be exposed to the fixing ring by the second opening.

Each of the first opening and the second opening may be formed with a plurality of openings.

The first openings and the second openings may be formed with the same number of openings at positions corresponding to each other.

The washer housing may further include a washer exposer provided on an inner circumferential surface of the washer housing and configured to expose an inner circumferential surface of the wave washer.

The wave washer and the washer housing may be made of different materials.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, a specific example of the present disclosure will be described with reference to the accompanying drawings. The following detailed description is provided to assist in gaining a comprehensive understanding of methods, apparatuses, and/or systems described in the present specification. However, this is purely exemplary and the present disclosure is not limited thereto.

In describing embodiments of the present disclosure, a detailed description of known technology related to the present disclosure will be omitted when it may unnecessarily obscure the subject matter of the present disclosure. In addition, the terms to be described later are terms defined taking into consideration functions obtained in accordance with the present disclosure. The definitions of these terms should be determined based on the whole content of this specification because they may be changed in accordance with the option of a user or an operator or a usual practice. The terms used in the detailed description are for the purpose of describing embodiments only of the present disclosure and are not intended to be limiting of embodiments of the disclosure. Unless the context clearly indicates otherwise, a singular form may also include a plural form. In the present disclosure, the terms "comprises", includes," etc. specify any features, numbers, steps, operations, elements, or combinations thereof and should not be interpreted as precluding the presence or possibility of one or more other features, numbers, steps, operations, elements, or combinations thereof.

Additionally, in describing components of the present disclosure, terms such as first, second, A, B, (a), and (b) may be used. These terms are used solely for the purpose of differentiating one component from another, and the substances, order, or sequence of the components are not limited by the terms.

Figure 1:
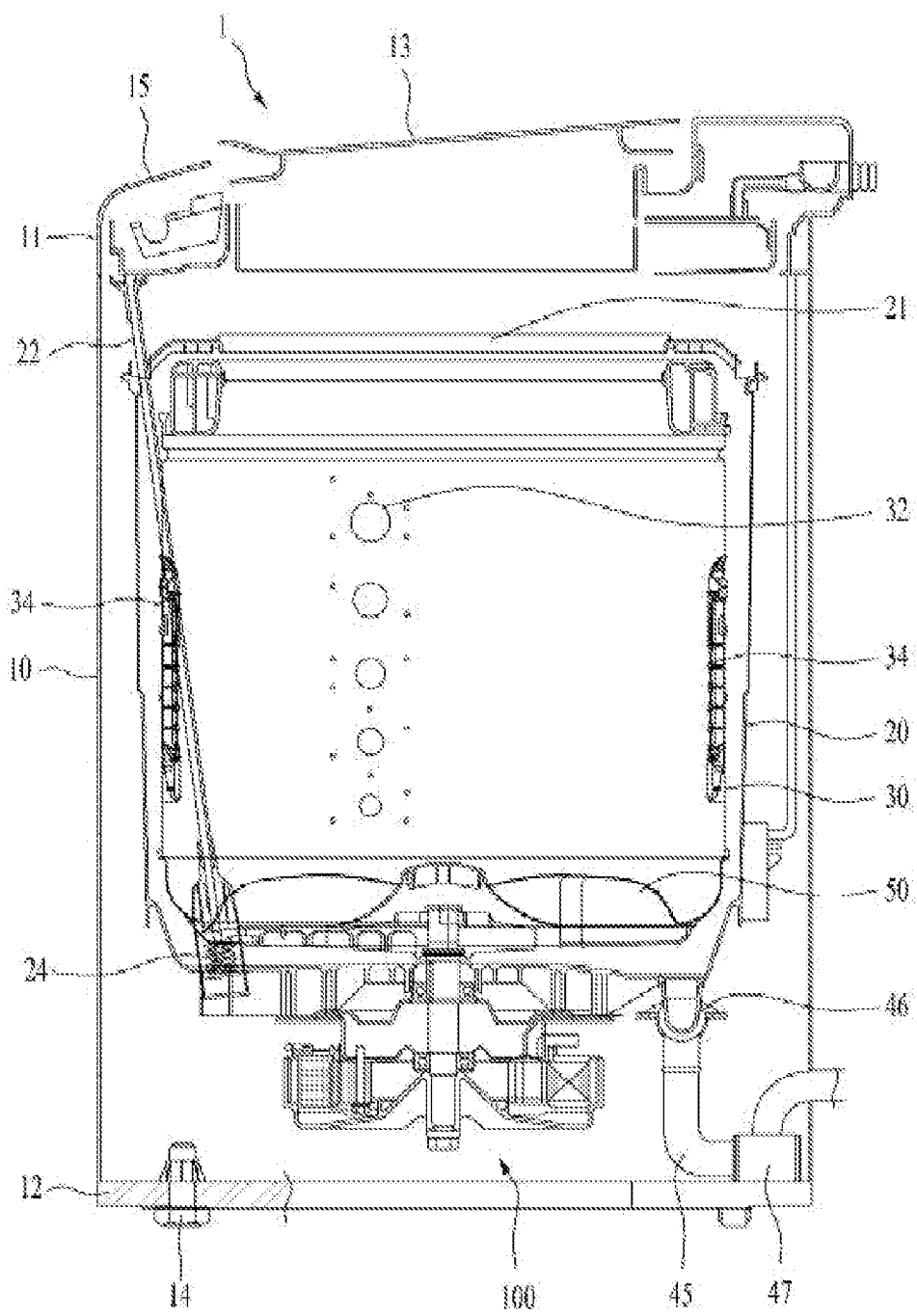
FIG. 1 is a cross-sectional view of a laundry treatment apparatus according to an embodiment of the present disclosure.

FIG. 1 is a cross-sectional view of a laundry treatment apparatus according to an embodiment of the present disclosure.

Referring to FIG. 1, a laundry treatment apparatus 1 according to an embodiment of the present disclosure may include a case 10 forming an external appearance of the laundry treatment apparatus 1, a top cover 11 disposed at an upper end of the case 10, and a base 12 disposed at a lower end of the case 10.

The case 10 is formed in a rectangular shape having an inner space, and upper and lower ends thereof are open. Various devices necessary for washing may be provided inside the case 10.

The top cover 11 is disposed at the upper end of the case 10 which is open and forms a laundry introduction port into which laundry may be introduced. In addition, a door 13 capable of opening and closing the laundry introduction port is provided at an upper side of the top cover 11. For example, the door 13 may be pivotally provided by a user.

The base 12 is disposed to shield the lower end of the case 10 which is open. One or plural legs 14 are disposed on a bottom surface of the base 12 to separate the base 12 from the ground. A horizontal level of the laundry treatment apparatus 1 may be adjusted by turning the legs 14.

The laundry treatment apparatus 1 is provided with a control panel 15 including various devices capable of controlling the laundry treatment apparatus 1. The control panel 15 may be disposed on an upper surface of the top cover 11.

The control panel 15 may include various input units provided to allow a user to operate the laundry treatment apparatus 1 and a display unit for showing the state of the laundry treatment apparatus 1 to the user. In addition, various printed circuit boards (PCBs) may be disposed in the control panel 15 to control the configuration of the laundry treatment apparatus 1 based on signals input through the input units.

A cylindrical tub 20 and a drum 30 are installed in an inner space of the laundry treatment apparatus 1 formed by the case 10, the top cover 11 and the base 12. The drum 30 has a smaller diameter than a diameter of the tub 20 so that the drum 30 may be accommodated inside the tub 20.

The tub 20 is filled with washing water for washing laundry. The tub 20 is formed in a cylindrical shape, and an opening 21 through which laundry may be introduced and removed may be formed on an upper surface of the tub 20.

The tub 20 may be installed inside the case 10 in a state spaced apart from the base 12 upward by a predetermined distance by a support member 22. For example, an upper end of the support member 22 may be supported at an upper portion of the case 10, and a lower end thereof may be coupled to a lower portion of the tub 20. A damper 24 for absorbing vibrations generated from the tub 20 and the drum 30 may be provided at the lower end of the support member 22.

The damper 24 may include a spring that absorbs vibrations generated from the drum 30 or a driver 100, which is to be described later, and transmitted to the tub 20 through elastic deformation.

The drum 30 may be defined as a washing tub rotated by the driver 100 to be described later for washing, rinsing, and dewatering of laundry. The drum 30 may be accommodated inside the tub 20, and an outer surface of the drum 30 is spaced apart from an inner surface of the tub 2 by a predetermined distance.

A plurality of washing holes 32 through which washing water flows in and out is formed on a side portion of the drum 30. Accordingly, washing water supplied to the tub 20 may fill the drum 30 through the plurality of washing holes 32.

In addition, a filter unit 34 for collecting various foreign substances including lint contained in washing water may be provided on an inner circumferential surface of the drum 30. A plurality of filter units 34 may be installed in a circumferential direction of the drum 30.

A water supply passage connected to an external water supply source to supply washing water into the tub 20 and the drum 30 is provided inside the laundry treatment apparatus 1. The water supply passage is provided with a water supply valve for opening and closing the water supply passage. The water supply valve may be provided in plural according to the type of water supplied. For example, the water supply valve may include a hot water valve and a cold water valve.

A drain passage 45 for draining washing water from the tub 20 and the drum 30 to the outside of the laundry treatment apparatus 1 is provided inside the laundry treatment apparatus 1. The drain passage 45 is provided with a drain valve 46 for opening and closing the drain passage 45. The drain passage 45 may further be provided with a drain pump 47 for pumping washing water drained into the drain passage 45 to the outside of the laundry treatment apparatus 1.

A pulsator 50 for forming a water flow for washing is rotatably provided at the bottom of the drum 30.

The driver 100 providing power for rotating the drum 30 or the pulsator 50 is provided inside the laundry treatment apparatus 1. The driver 100 includes a dewatering shaft for rotating the drum 30 and a washing shaft for rotating the pulsator 50 and selectively rotates the dewatering shaft and the washing shaft.

Figure 2:
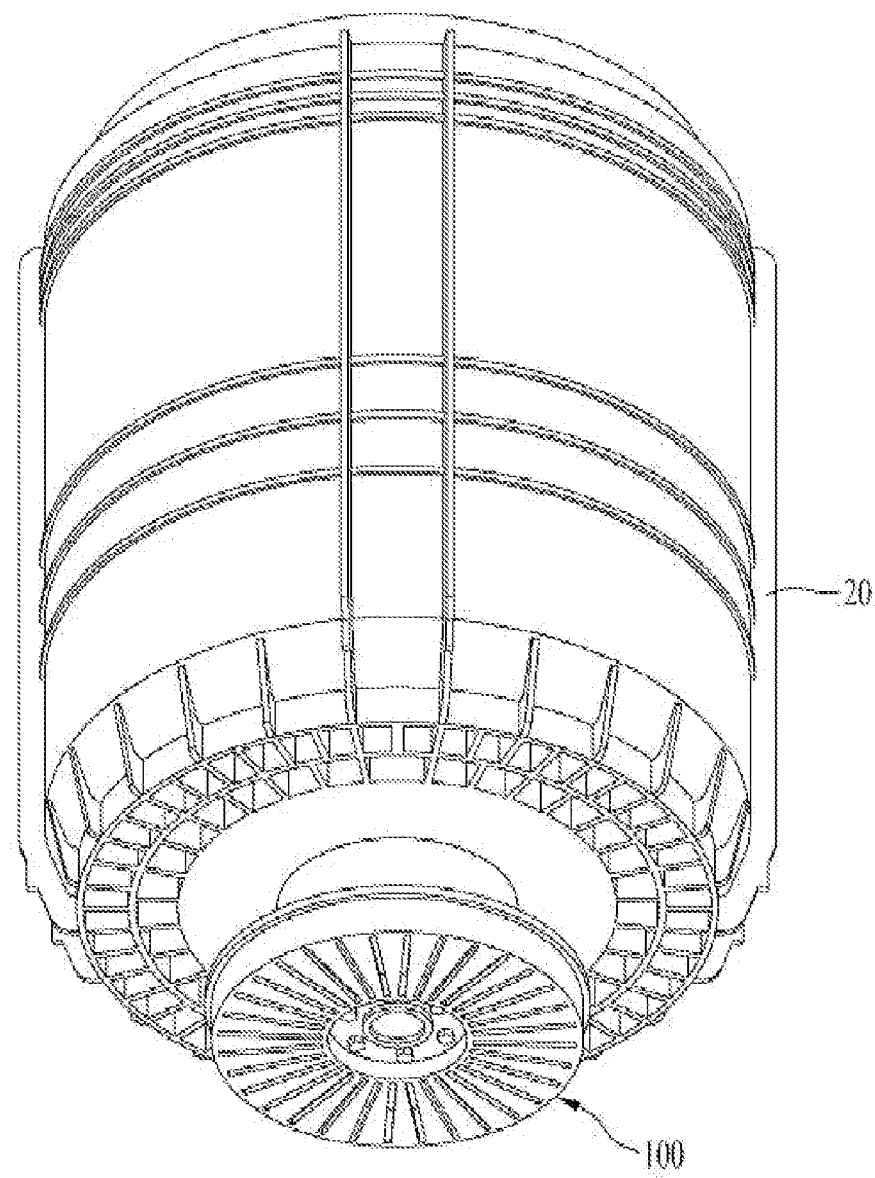
FIG. 2 is a perspective view showing a shape in which a driver according to an embodiment of the present disclosure is installed in a tub.
Figure 3:
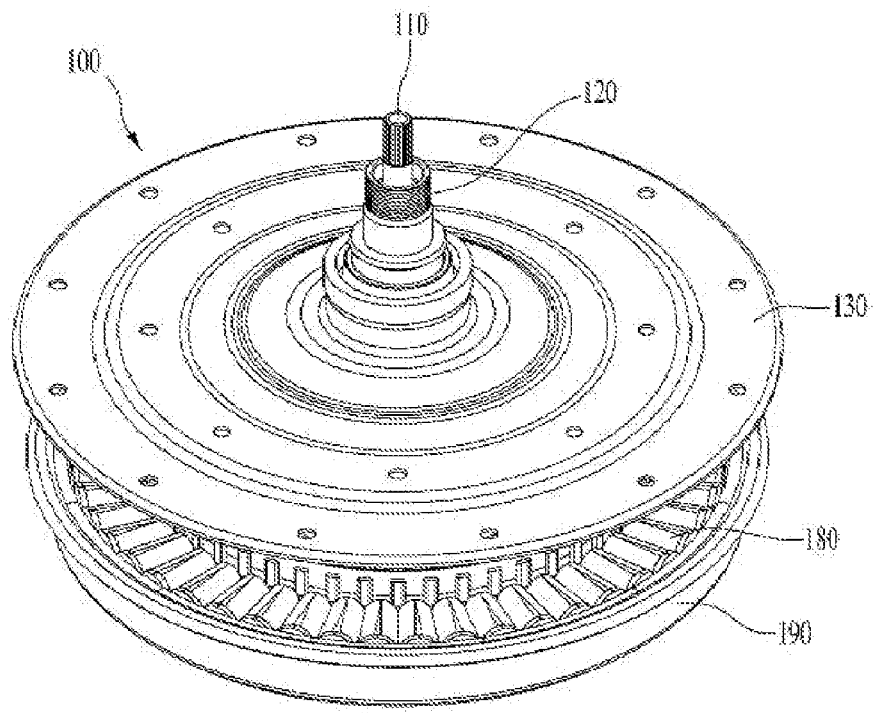
FIG. 3 is a perspective view of the driver.
Figure 4:
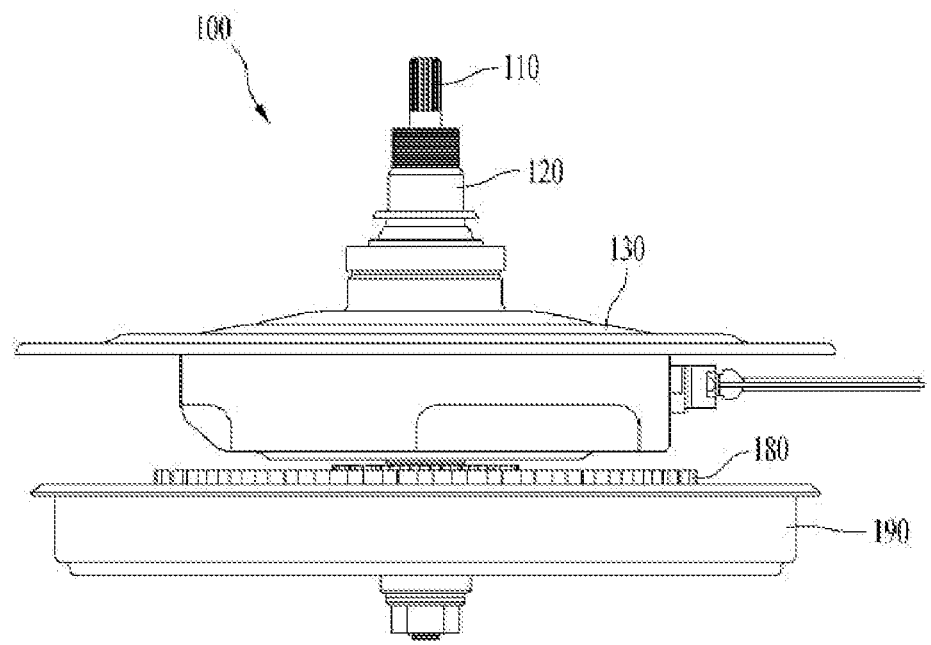
FIG. 4 is a side view of the driver.

FIG. 2 is a perspective view of a bottom surface of a tub in which a driver according to an embodiment of the present disclosure is installed, FIG. 3 is a perspective view of the driver, and FIG. 4 is a side view of the driver.

Referring to FIGS. 2 to 4, the driver 100 according to an embodiment of the present disclosure is disposed at a lower portion of the tub 20. The driver 100 may be understood as a means providing power for rotating the pulsator 50 or rotating the pulsator 50 and the drum 20 together.

The driver 100 may include a washing shaft 110 that transmits power to the pulsator 50, a dewatering shaft 120 that transmits rotational power to the drum 30, a bearing housing 130 that supports the washing shaft 110 and the dewatering shaft 120, and a driving motor 180 and 190 disposed at a lower portion of the bearing housing 130 to provide driving force to the washing shaft 110 or the dewatering shaft 120.

Hereinafter, the driver 100 will be described in more detail with reference to the drawings.

Figure 5:
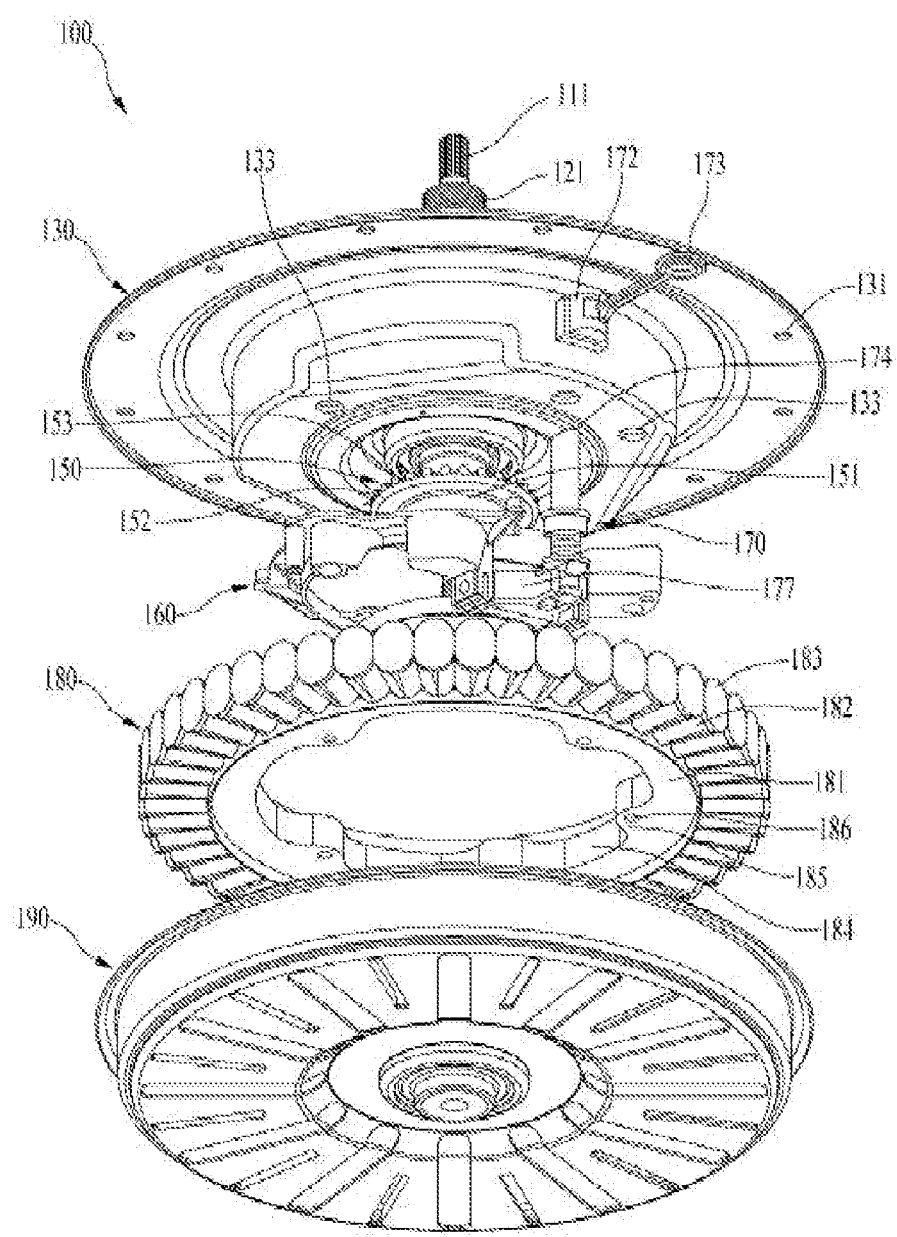
FIG. 5 is an exploded perspective view of the driver.
Figure 6:
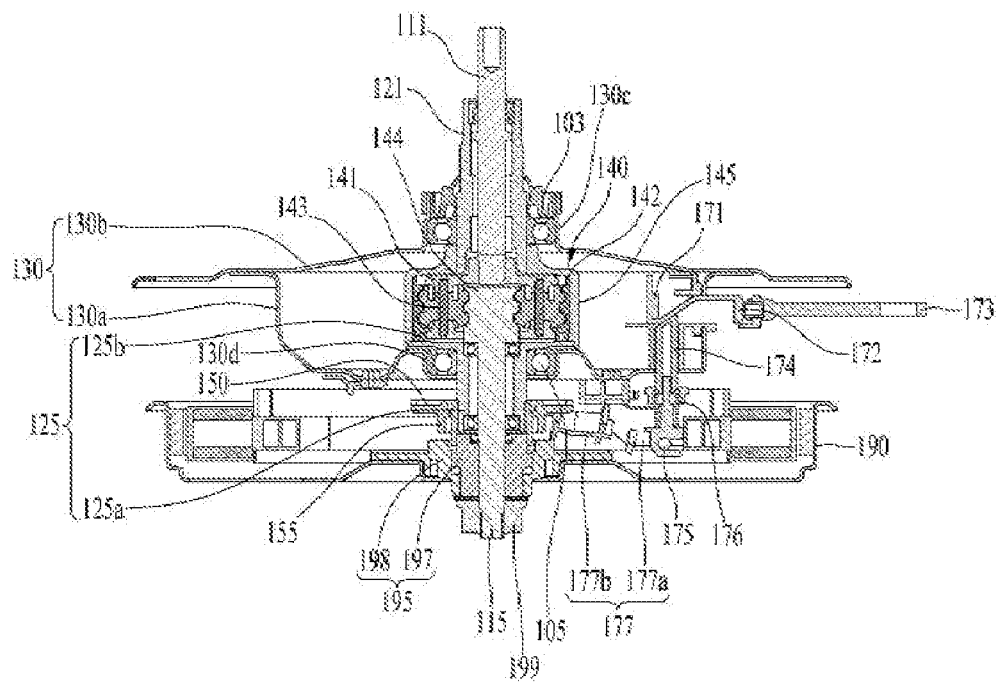
FIG. 6 is a longitudinal cross-sectional view of the driver.
Figure 7:
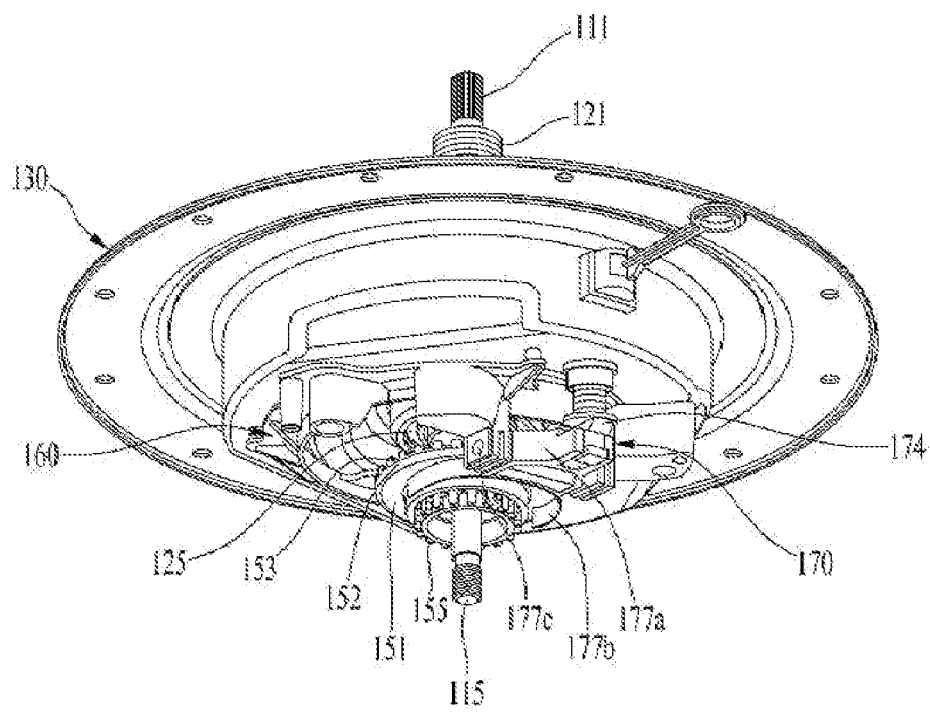
FIG. 7 is a perspective view showing a state in which driving motors are removed from the driver.
Figure 8:
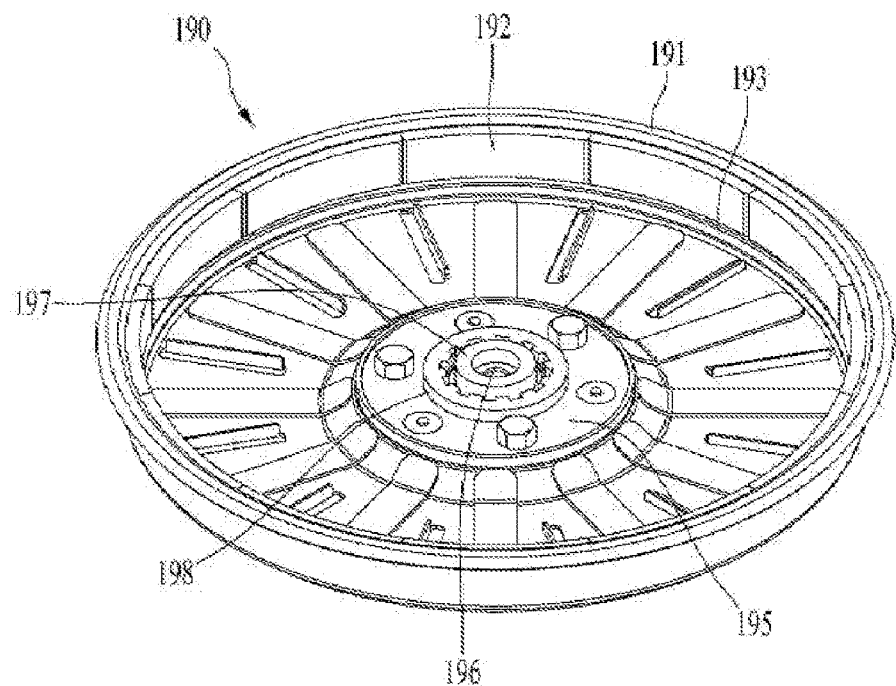
FIG. 8 is a perspective view showing a rotor of the driver.

FIG. 5 is an exploded perspective view of the driver, FIG. 6 is a longitudinal cross-sectional view of the driver, FIG. 7 is a perspective view showing a state in which driving motors are removed from the driver, and FIG. 8 is a perspective view showing a rotor of the driver.

Referring to FIGS. 5 to 8, the driver 100 includes the washing shaft 110, the dewatering shaft 120, the bearing housing 130, and the driving motor 180 and 190, as described above.

Specifically, the washing shaft 110 includes an upper washing shaft 111, and a lower washing shaft 115 which is positioned at a lower portion of the upper washing shaft 111. The dewatering shaft 120 includes an upper dewatering shaft 121, and a lower dewatering shaft 125 positioned at a lower portion of the upper dewatering shaft 121.

The upper washing shaft 111 passes through the center of the upper dewatering shaft 120 to protrude into the drum 30. An end of the upper washing shaft 111 protruding into the drum 30 is connected to the pulsator 50. The other end of the upper washing shaft 111 extends downward and is connected to a planetary gear module 140 disposed inside the bearing housing 130.

The upper washing shaft 111 is fixed to a bottom portion of the drum 30 and rotates as one body with the drum 30.

The lower washing shaft 115 is disposed to be spaced downward from the upper washing shaft 111. A lower end of the lower washing shaft 115 is coupled to a rotor 190 of the driving motor, and an upper end thereof is connected to the planetary gear module 140. That is, the planetary gear module 140 connects the lower end of the upper washing shaft 111 and the upper end of the lower washing shaft 115.

The upper washing shaft 111 is inserted into the upper dewatering shaft 121 by passing through the inside of the upper dewatering shaft 121, and the upper dewatering shaft 121 and the upper washing shaft 111 are concentric. One end of the upper dewatering shaft 121 is coupled to the drum 30 to transmit rotational force to the drum 30, and the other end thereof is connected to the planetary gear module 140.

The lower dewatering shaft 125 is disposed to be spaced downward from the upper dewatering shaft 121. The lower washing shaft 115 is inserted into the lower dewatering shaft 125 by passing through the inside of the lower dewatering shaft 125, and the lower dewatering shaft 125 and the lower washing shaft 115 are concentric. An upper end of the lower dewatering shaft 125 is connected to the planetary gear module 140, and a lower end thereof is coupled with the rotor 190 by a coupler 150 to be described later to receive rotational force. In this case, a serration for engaging with the coupler 150 is formed on an outer circumference surface of the lower dewatering contraction 125. Accordingly, the coupler 150 is installed to be movable up and down along the lower dewatering shaft 125.

According to the configuration of the present disclosure described above, rotational force generated by the drive motor is decelerated through the planetary gear module 140 and then is transferred to the upper washing shaft 111 and/or the upper dewatering shaft 121. Accordingly, the pulsator 50 or the drum 30 is rotated with a relatively high torque, so that the driving motor may be efficiently operated and, as a result, the driving motor may be made slim.

The bearing housing 130 supports the washing shaft 110 and the dewatering shaft 120 and accommodates the planetary gear module 140 including a plurality of gears therein. The bearing housing 130 is disposed at a lower side of the tub 20. The bearing housing 130 may be fixed to a bottom surface of the tub 20 by a fastening member. A plurality of fastening holes 131 through which the fastening member passes may be formed in an upper edge of the bearing housing 130, and the fastening holes 131 may be spaced apart in a circumferential direction of the housing 130. The fastening member passing through the fastening holes 131 is inserted and fixed to a bottom surface of the tub 20.

The bearing housing 130 forms an internal space for accommodating the planetary gear module 140. Specifically, the bearing housing 130 may include a housing case 130a in which the planetary gear module 140 is accommodated in the center thereof, and a housing cover 130b covering an opened upper surface of the housing case 130a. The fastening holes 131 may be disposed at an outer edge of the housing cover 130b.

A clutch stopper 160 may be coupled to a lower portion of the bearing housing 130 by a fastening member. Specifically, a plurality of fastening holes 133 for inserting the fastening member may be formed on a bottom surface of the housing case 130a. The clutch stopper 160 may be mounted on a bottom surface of the bearing housing 130 by inserting the fastening member into the fastening holes 133 through the clutch stopper 160.

Although the fastening holes 133 may be formed of three holes, the number of the fastening holes 133 is not limited thereto and the fastening holes may be disposed at equal intervals.

The upper washing shaft 111 and the upper dewatering shaft 121 are inserted through the center of an upper surface of the bearing housing 130, that is, the center of the housing cover 130b.

Specifically, a sleeve 130c for inserting a bearing may be extended at a center portion of the housing cover 130b, and the upper dewatering shaft 121 is connected to the planetary gear module 140 by penetrating the sleeve 130c. An upper shaft support bearing 103 is interposed between an outer circumferential surface of the upper dewatering shaft 121 and the sleeve 130c, so that the upper dewatering shaft 121 is rotatably supported. When the upper dewatering shaft 121 rotates, the upper shaft support bearing 103 prevents frictional force from being generated between the upper dewatering shaft 121 and the sleeve 130c.

In addition, the lower washing shaft 115 and the lower dewatering shaft 125 are inserted through the center of a lower surface of the bearing housing 130, that is, the center of a bottom portion of the housing case 130a. A sleeve 130d is extended at the center of the bottom portion of the housing case 130a, and the lower dewatering shaft 125 is connected to the planetary gear module 140 by passing through the sleeve 130d. A lower shaft support bearing 105 is provided between the sleeve 130d and the lower dewatering shaft 125, so that the lower dewatering shaft 125 is rotatably supported.

The driving motor is disposed below the bearing housing 130. The driving motor includes a stator 180 that generates magnetic force by supplied power, and a rotor 190 that rotates by induced electromotive force through interaction with the stator 180.

Specifically, the stator 180 includes a yoke portion 181 formed by stacking a magnetic core on an inner circumferential surface thereof, a pole 183 that radially protrudes from a side surface of the yoke portion 181, is spaced apart in a circumferential direction of the yoke portion 181, and is wound with a coil 182, and an insulator 184 that covers an outer circumferential surface of the magnetic core to prevent direct contact between the coil 182 and the magnetic core.

The stator 180 further includes a fastening protrusion portion 185 that protrudes from an inner circumferential surface of the yoke portion 181, specifically, from an inner circumferential surface of the insulator 184, in a center direction of the yoke portion 181. The fastening protrusion portion 185 is a portion for fastening the stator 180 to the bearing housing 130 using a fastening member.

A fastening hole 186 is formed in the fastening protrusion 185, and a fastening member is inserted into a lower surface of the bearing housing 130 by passing through the fastening hole 186.

In this case, the clutch stopper 160 is interposed between the stator 180 and the bearing housing 130, and the fastening member sequentially penetrates the stator 180, the clutch stopper 160, and the bearing housing 130.

A plurality of fastening protrusions 185 may be disposed in a circumferential direction on an inner circumferential surface of the yoke portion 181. The fastening protrusions 185 may be disposed at equal intervals.

In FIG. 5, six fastening protrusions 185 are formed on the inner circumferential surface of the yoke portion 181. However, in the present disclosure, the fastening member is inserted only through three fastening protrusions 185 among the six fastening protrusions 185. That is, the stator 180 is supported by being fastened to the bearing housing 130 at three points. According to such a three-point fastening structure, there is an advantage in that the amount of vibration transmission is reduced compared to a conventional driver having a six-point fastening structure. Specifically, when vibration generated from the driving motor is transmitted to the bearing housing 130 through the clutch stopper 160, since the number of fastening members serving as a transmission medium is reduced from 6 to 3, the amount of vibration transmission is also reduced.

The rotor 190 is a portion that rotates due to an electrode difference with the stator 180.

The rotor 190 is disposed to surround an outer circumferential surface of the stator 180. The rotor 190 may have, for example, a flat cylindrical shape, an upper surface of which is open. The stator 180 may be placed inside the rotor 190 through the opened upper surface, thereby constituting an outer rotor type motor.

Specifically, referring to FIG. 8, the rotor 190 includes a rotor frame 191 forming an outer appearance, and a magnet 192 attached to an inner wall of the rotor frame 191. The magnet 192 is mounted on the inner wall of the rotor frame 191 to form a step 193 supporting a lower end of the magnet 192.

A shaft coupling portion 195 for coupling the lower washing shaft 115 and the lower dewatering shaft 125 is provided at the center of the rotor 190. The shaft coupling portion 195 includes a shaft coupling boss 197 having a shaft through-hole 196 through which the lower washing shaft 115 passes, and an engaging portion 198 that is formed at an outer side of the shaft coupling boss 197 and is engaged with a serration of the coupler 150.

The shaft coupling portion 195 is fixedly coupled to the rotor 190 and rotates integrally with the rotor 190. A nut 199 is fitted to an end of the lower washing shaft 115 passing through the shaft coupling part 195 so that the lower washing shaft 115 is configured to rotate together with the shaft coupling portion 195 and the rotor 190 as one body.

The planetary gear module 140 constituting the driver 100 is a means for increasing torque transferred to the pulsator 50 by reducing rotational force generated by the driving motor.

Specifically, the planetary gear module 140 includes a planetary gear case 145, a sun gear 144 accommodated inside the planetary gear case 145, a plurality of planetary gears 142 interlocked with an outer circumference surface of the sun gear 144, and a carrier 141 supporting the planetary gears 142.

More specifically, a plurality of gear shafts 143 to which the planetary gear 142 is fitted is disposed in the carrier 141 in a circumferential direction, and a through-hole through which the gear shafts pass is formed at the center of the planetary gears 142. By this structure, the carrier 141 may support the planetary gears 142 and is rotatable together with the planetary gears 142. The sun gear 144 is disposed at the center of the planetary gears 142, and the planetary gears 142 are interlocked with the sun gear 144 to rotate. At the same time, the planetary gears 142 are engaged with a serration formed on an inner circumferential surface of the planetary gear case 145 to rotate.

An upper end of the lower dewatering shaft 125 is fixed to a bottom surface of the planetary gear case 145, so that the lower dewatering shaft 125 and the planetary gear case 145 integrally rotate. As shown, the lower dewatering shaft 125 includes a cylindrical shaft portion 125a through which the lower washing shaft 115 passes, and a circular support portion 125b extending from an upper end of the shaft portion 125a in a direction perpendicular to the shaft portion 125a, that is, in a horizontal direction. In addition, the support portion 125b forms a bottom surface of the planetary gear case 145 to support the sun gear 144 and the planetary gears 142. An upper end of the planetary gear case 145 is unitedly connected to the upper dewatering shaft 121. A rounded octagonal groove is formed on an upper portion of the carrier 141 so as to be engaged with a lower end of the upper washing shaft 111. Accordingly, the carrier 141 integrally rotates with the upper washing shaft 111.

The sun gear 144 is connected to an upper end of the lower washing shaft 115. In a washing mode, rotational force generated by the driving motor is sequentially transferred to the sun gear 144, the planetary gear 142, the carrier 141, and the upper washing shaft 111 via the lower washing shaft 115. The rotational force generated by the driving motor is converted into a form in which rotational speed is decreased but torque is increased by the planetary gear module 140 and is then transferred to the upper washing shaft 111.

The driver 100 further includes the coupler 150. The coupler 150 is coupled to an outer circumference surface of the lower dewatering shaft 125 and may move in a vertical direction (up and down direction) along the lower dewatering shaft 125. The coupler 150 vertically moves along the lower dewatering shaft 125 to selectively transfer rotational force caused by rotation of the rotor 190 to the lower dewatering shaft 125 and the lower washing shaft 115.

Specifically, the coupler 150 includes a cylindrical body 151 having a serration on each of an upper surface and a lower surface thereof. A through-hole through which the lower dewatering shaft 125 passes is formed in the center of the body 151. A serration that is engaged with an outer circumferential surface of the lower dewatering shaft 125 is formed on an inner circumferential surface of the through-hole.

The coupler 150 descends along the lower dewatering shaft 125 in a state in which the serration formed on the inner circumferential surface of the through hole is coupled to a serration formed on the outer circumferential surface of the lower dewatering contraction 125, so that the serration formed on a lower surface of the coupler 150 is coupled to the engaging portion 198 of the rotor 190. When the coupler 150 rises, the engaging portion 198 of the rotor 190 and the serration formed on the lower surface of the coupler 150 are separated.

A flange portion 152 extending in a radial direction of the body 151 is formed at an upper end of the body 151. In addition, a stop gear 153 may be formed in a circumferential direction at an upper edge of the flange portion 152. A connecting gear 155 engaged with the engaging portion 198 of the shaft coupling portion 195 is formed in a circumferential direction at a lower edge of the body 151.

A compression spring that pushes the coupler 150 downward when a mode is switched from a washing mode to a dewatering mode is provided between an upper surface of the coupler 150 and the lower shaft support bearing 105.

The driver 100 may further include a clutch mechanism 170 for switching a power transmission path of the drive motor to the washing shaft 110 or the dewatering shaft 120 in response to a washing cycle or a dewatering cycle. The clutch mechanism 170 functions to elevate the coupler 150 to a raised position by the operation of a clutch motor.

Specifically, the clutch mechanism 170 may include a clutch motor installed at a lower portion of the tub 20, a cam coupled to a drive shaft of the clutch motor, a lever guide 171 fixed to an inner portion of the bearing housing 130, and a lever 172 that linearly reciprocates under the guidance of the lever guide 171 when the clutch motor is turned on or off.

The clutch mechanism 170 may further include a connecting rod 173 installed between the cam of the clutch motor and the lever 172 to pull the lever 172 toward the clutch motor according to driving of the clutch motor, and a return spring having one end fixed to the lever guide 171 and the other end fixed to the lever 172 to apply return force to the lever 172.

The clutch mechanism 170 may further include a mover 174 that descends along an inclined surface of the lever 172 when the clutch motor is turned on, a plunger 175 that moves up and down along a guide groove inside the mover 174, and a buffer spring 176 provided on an outer circumferential surface of the plunger 175.

A clutch lever 177 for substantially supporting the coupler 150 is provided at a lower end of the plunger 175. One end of the clutch lever 177 is coupled to the plunger 175 and the other end thereof contacts the coupler 150 to function to lift the coupler 150.

Specifically, the clutch lever 177 may include a connection portion 177a coupled to an end of the plunger 175, a support portion 177b extending from the connection portion 177a toward the coupler 150, and a fixing pin 177c extending from both side edges of the connection portion 177a to serve as a rotation center of the clutch lever 177. The fixing pin 177c may be defined as a hinge shaft.

The connecting portion 177a has one end connected to an end of the plunger 175 and the other end at which the support portion 177b is formed. The connection portion 177a and the support portion 177b may be formed horizontally. The fixing pin 177c passes through the connecting portion 177a in a horizontal direction and is coupled to a clutch stopper 160 to be described later. That is, the support portion 177b is hinged to the clutch stopper 160 by the fixing pin 177c and is installed to be rotatable by a predetermined amount.

The support portion 177b, protrudes toward the coupler 150 from an end of the connection portion 177a to raise and lower the coupler 150. The support portion 177b functions to press the coupler 150 to a raised position when a mode is switched to a washing mode.

The support portion 177b is extended from an end of the connection portion 177a toward the coupler 150 in a state of being divided into both sides, so that the support portion 177b and the connection portion 177a are Y-shaped. In addition, two ends of the extended support portion 177b may be disposed to surround an edge of the coupler 150.

For example, at least a portion of the support portion 177b may surround an outer circumferential surface of a body 151 of the coupler 150. In addition, a portion of an upper surface of the support portion 177b may contact a lower surface of the flange portion 151 of the coupler 150. In this case, the support portion 177b may be disposed to be hung on an outer circumferential surface of the coupler 150 or may be fixed to a portion of the outer circumferential surface of the coupler 150. That is, various methods other than a method presented in the embodiment of the present disclosure may be proposed as a method of bringing the support portion 177b into contact with the coupler 150.

The driver 100 may further include a clutch stopper 160 for limiting the rotation amount of the clutch lever 177. The clutch stopper 160 functions to suppress movement of the coupler 150 so that impact is not applied to the clutch motor, the washing shaft 110, or the dewatering shaft 120 by allowing the coupler 150 to rotate after the coupler 150 is disengaged from the rotor 190.

The clutch stopper 160 is fixed to a bottom surface of the bearing housing 130 by a fastening member.

The clutch lever 177 is hinged to the clutch stopper 160 so that the clutch lever 177 is rotatable. The clutch stopper 160 guides the clutch lever 177 to stably raise or lower the coupler 150.

Hereinafter, the operation of the driver will be described in detail with reference to the drawings.

First, the operation of the driver according to a washing cycle (or washing mode) will now be described with reference to FIG. 6. When a washing command is input to the laundry treatment apparatus 1, the clutch motor of the clutch mechanism 170 is turned on. When the clutch motor is turned on, the connecting rod 173 is pulled toward the clutch motor and the lever 172 is also pulled.

When the lever 172 is pulled toward the clutch motor, the mover 174 descends along an inclined surface of the lever 172. In this case, when the plunger 175 descends together with the mover 174, the clutch lever 177 rotates upward by pushing force of the plunger 175.

In this case, as the clutch lever 177 moves upward, the clutch lever 177 pushes the coupler 150 upward, so that the coupler 150 rises along the lower dewatering shaft 125. Then, the coupler 150 is disengaged from the rotor 190 and is coupled to the lower dewatering shaft 125. In this case, the coupler 150 is released from the rotor 190 so that only the washing shaft 110 rotates when the rotor 190 rotates.

That is, in the washing mode, since the serration formed on the inner circumferential surface of the coupler 150 is engaged only with the serration of the outer circumferential surface of the lower dewatering shaft 125 and is not engaged with the serration of the engaging portion 198 engaged with the lower washing shaft 115, rotational force of the rotor 190 is transferred only to the pulsator 50 through the washing shaft 110.

Specifically, the rotational force of the rotor 190 in the washing mode is sequentially transferred to the shaft coupling boss 197 of the rotor 190, the lower washing shaft 115 coupled to the shaft coupling boss 197, the sun gear 144, the planetary gear 142, the carrier 141, and the upper washing shaft 111.

The operation of the driver according to a dewatering cycle (or dewatering mode) will be described with reference to the drawings.

Figure 9:
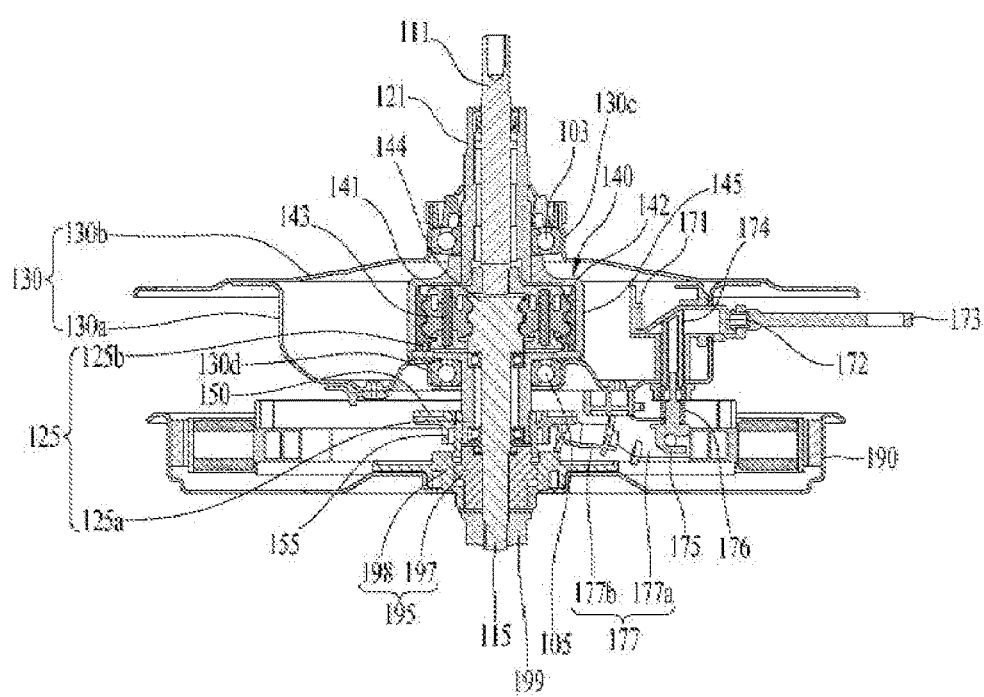
FIG. 9 is a longitudinal cross-sectional view showing the driver in a dewatering mode according to an embodiment of the present disclosure.

FIG. 9 is a longitudinal cross-sectional view showing the driver in a dewatering mode according to an embodiment of the present disclosure.

Referring to FIG. 9, when a dewatering command is input to the laundry treatment apparatus 1, the clutch motor of the clutch mechanism 170 is turned off.

When the clutch motor is turned off, the connecting rod 173, which has been pulled toward the clutch motor, returns to an original position thereof, and the mover 174 rises along an inclined surface of the lever 172. In this case, when the plunger 175 rises together with the mover 174, the clutch lever 177 rotates downward.

As the clutch lever 177 moves downward, the coupler 150 is lowered due to weight thereof and pushing force of the compression spring. When the coupler 150 is completely lowered along the lower dewatering shaft 125, the connecting gear 155 formed at a lower portion of the coupler 150 is engaged with the engaging portion 198 of the rotor 190.

In other words, when the coupler 150 is completely lowered, the coupler 150 is coupled to the rotor 190 and is in a state of being coupled to the lower dewatering shaft 125. In this case, since the coupler 150 simultaneously transfers rotational force generated by the rotor 190 to the lower washing shaft 115 and the lower dewatering shaft 125, the washing shaft 115 and the dewatering shaft 125 rotate at high speed, thereby performing dewatering.

In addition, since the washing shaft 110 and the dewatering shaft 120 integrally rotate, the planetary gear 142 does not rotate and revolves around the sun gear 144 in a state of being engaged with the sun gear 144 when the sun gear 144 inside the planetary gear module 140 rotates with the lower washing shaft 115. Accordingly, the washing shaft 110 and the dewatering shaft 120 rotate at the same rotational speed.

Hereinafter, the coupling structure of the lower washing shaft 115 and the lower dewatering shaft 125 will be described in more detail with reference to the drawings.

Figure 10:
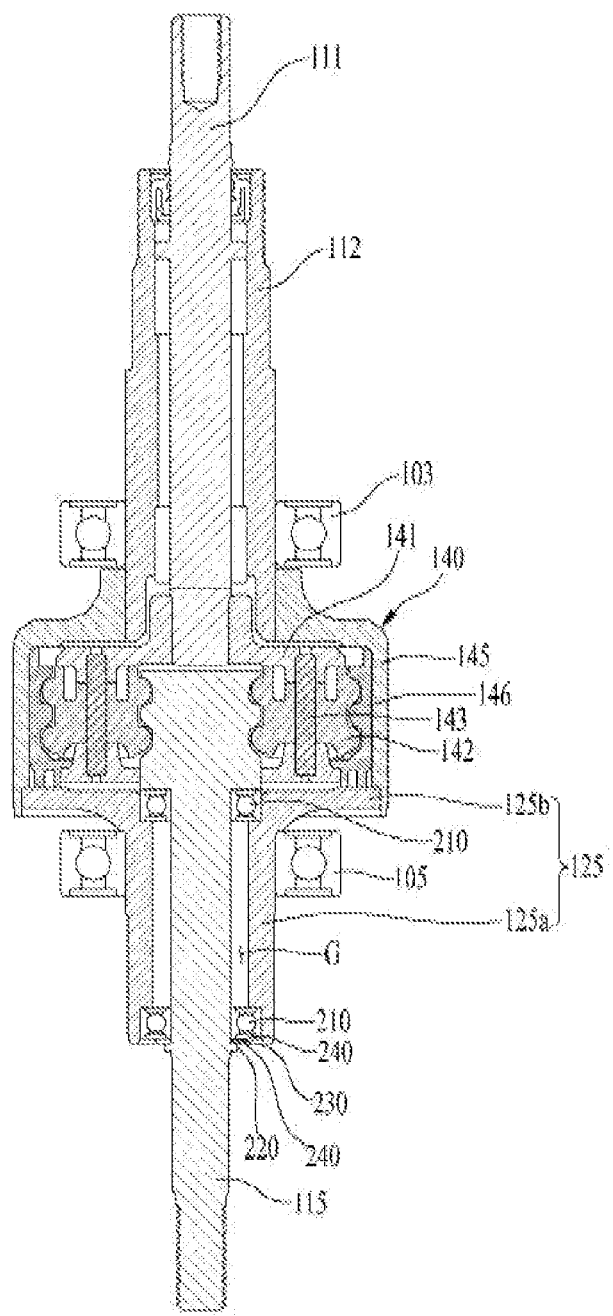
FIG. 10 is a longitudinal cross-sectional view showing a state in which a driving motor and a bearing housing are removed from the driver.
Figure 11:
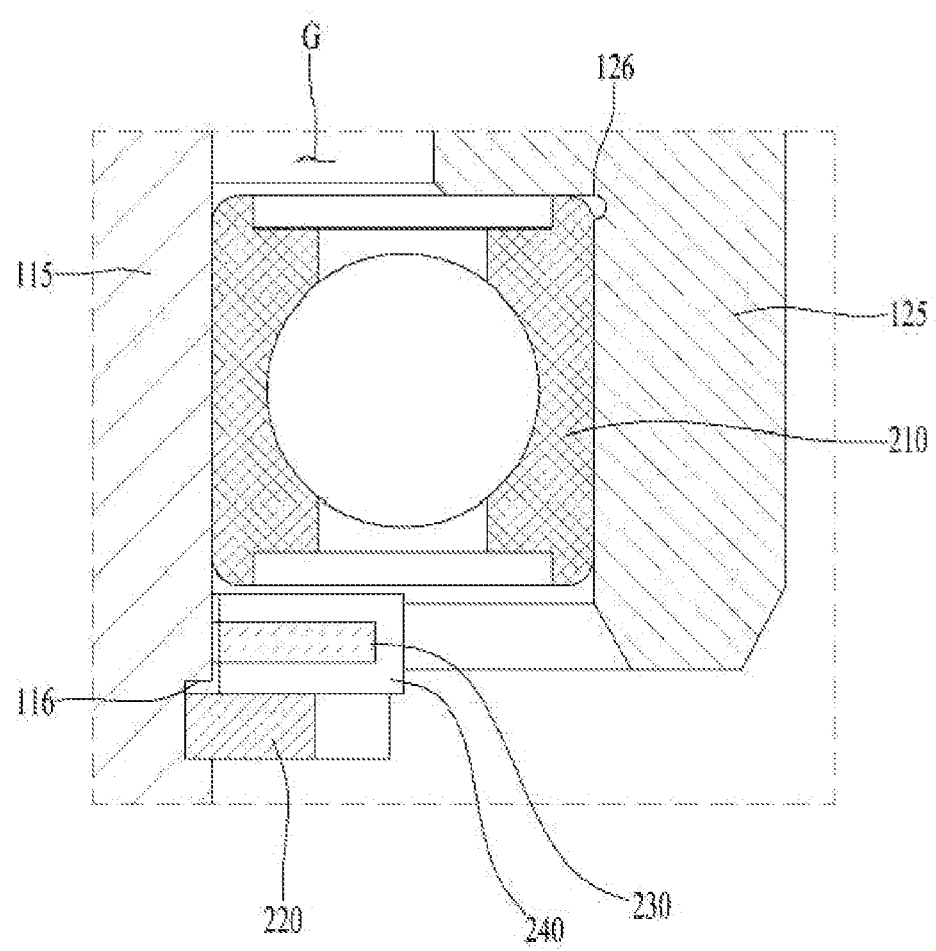
FIG. 11 is an enlarged view showing a connection portion between a washing shaft and a dewatering shaft in FIG. 10.
Figure 12:
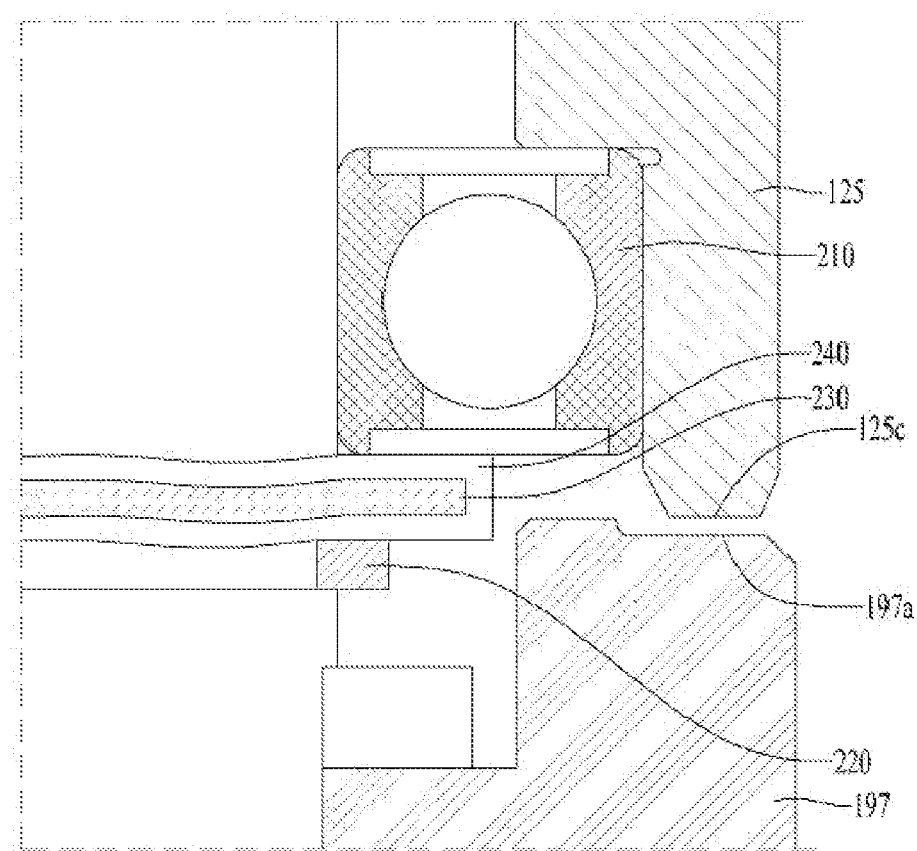
FIG. 12 is a view showing a state in which the washing shaft is removed in FIG. 11.

FIG. 10 is a longitudinal cross-sectional view showing a state in which the driving motor and the bearing housing are removed from the driver, FIG. 11 is an enlarged view showing a connection portion between the washing shaft and the dewatering shaft in FIG. 10, and FIG. 12 is a view showing a state in which the washing shaft is removed in FIG. 11.

Referring to FIGS. 10 to 12, an anti-friction member 210 is inserted between the dewatering shaft 120 and the washing shaft 110.

In the following description, although the dewatering axis 120 will be described as being the lower dewatering axis 125, and the washing axis 110 will be described as being the lower washing axis 115, the scope of the present disclosure is not limited thereto, and the dewatering axis 120 may correspond to the upper dewatering axis 121, and the washing axis 110 may correspond to the upper washing axis 111.

The washing shaft 110 includes the lower washing shaft 115 having an upper portion connected to or integrally formed with a lower portion of the sun gear 144 and a lower portion connected to the rotor 190, and the upper washing shaft 111 having an upper portion connected to the pulsator 50 and a lower portion connected to the carrier 141.

The hydration shaft 120 includes the lower hydration shaft 125 having a lower end selectively connected to the rotor 190 by the coupler 150 and an upper end connected to the ring gear 146, and the upper dewatering shaft 121 having a lower end connected to the ring gear 146 and an upper end connected to the drum.

In this state, when washing is performed, only the lower washing shaft 115 connected to the rotor 190 rotates in a state in which the lower dewatering shaft 215 which is not connected to the rotor 190 is fixed (does not rotate). On the other hand, when dewatering is performed, both the lower dewatering shaft 215 and the lower washing shaft 115 are connected to the rotor 190, and both the lower dewatering shaft 215 and the lower washing shaft 115 rotate.

In a washing process, at least a portion of an outer circumferential surface of the lower washing shaft 115 and an inner circumferential surface of the lower dewatering shaft 125 are spaced apart from each other so that the lower washing shaft 115 may rotate without interference of the lower dewatering shaft 125, and a gap G is formed between the outer circumferential surface of the lower washing shaft 115 and the inner circumferential surface of the lower dewatering shaft 125.

The anti-friction member 210 is formed between the lower washing shaft 114 and the lower dewatering shaft 125 so that the lower washing shaft 115 may rotate smoothly without interference of the lower dewatering shaft 125 in a state in which the lower washing shaft 115 is fixed to an inner portion of the lower dewatering shaft 125.

For example, the anti-friction member 210 may be provided as a bearing. In detail, the anti-friction member 210 may be provided as a thrust ball bearing.

The thrust ball bearing is a kind of bearing used to support thrust acting in a rotational axis direction.

As another example, the anti-friction member 210 may include a plurality of bearings. Specifically, in order to supplement the thrust ball bearing receiving only thrust, a radial ball bearing may be additionally used together with the thrust ball bearing.

In this case, a seating groove 126 in which the anti-friction member 210 is seated may be formed on at least one of the outer circumferential surface of the lower washing shaft 115 or the inner circumferential surface of the lower dewatering shaft 125.

When the seating groove 126 is formed as described above, at least two surfaces of the anti-friction member 210 are supported in contact with the outer circumferential surface of the lower washing shaft 115 or the inner circumferential surface of the lower dewatering shaft 125, thereby securing fixing force of the anti-friction member 210.

In addition, since at least a portion of the anti-friction member 210 is accommodated in the lower washing shaft 115 or the lower dewatering shaft 125, the gap G between the lower washing shaft 115 and the lower dewatering shaft 125 may be formed thinner than the thickness of the anti-friction member 210.

As described above, the planetary gear module 140 that controls the rotation ratio of the driving motor and the lower washing shaft 115 to transfer the same to the upper washing shaft 111 is provided inside the bearing housing 130.

The planetary gear module 140 includes the sun gear 144 which rotates by receiving the rotational force of the driving motor and has an outer circumferential surface on which gear teeth are formed, the plural planetary gears 142, each of which has an outer circumferential surface on which gear teeth are formed and is engaged with the sun gear 144 to rotate around the sun gear 144, the ring gear 145 which has an inner circumferential surface on which gear teeth are formed, is disposed coaxially with the sun gear 144, and is engaged with the sun gear 142, and the carrier 141 which is rotatably connected to the gear shaft 143 of each of the planetary gears 142 and rotates coaxially with the sun gear 144.

In this case, the inner circumferential surface of the planetary gear case 145 described above may be coupled to the outer circumferential surface of the ring gear 145. The planetary gear case 145 and the ring gear 145 may be integrally formed.

For reference, among the ring gear 145, the planetary gear 142, and the sun gear 144, the ring gear 145 has the largest diameter (inner diameter) and the planetary gear 142 has the smallest diameter (outer diameter). The diameter (outer diameter) of the sun gear 144 is larger than the diameter (outer diameter) of the planetary gear 142 but is smaller than the diameter (inner diameter) of the ring gear 145.

For example, three or four planetary gears 142 may be provided.

The lower washing shaft 115 and the sun gear 144 may be integrally formed to facilitate power transfer.

A fixing groove 116 concavely formed inwardly in a circumferential direction is formed on an outer circumferential surface of the lower washing shaft 115, and an inner circumferential surface of a fixing ring 220 having an outer circumferential surface formed to protrude further outward than the lower washing shaft 115 is fitted to the fixing groove 116.

For example, the fixing ring 220 may be formed as a 'C'-shaped ring having one side at which a cut portion or an opening is formed.

As described above, the seating groove 126 in which the anti-friction member 210 is seated is formed on the inner circumferential surface of the lower dewatering shaft 125.

Then, an upper (or lower) end of the anti-friction member 210 may be supported by the seating groove 126 in contact with the seating groove 126, and the lower (or upper) end thereof may be supported by the fixing ring 220 in contact with the fixing ring, thereby securing fixing force of the anti-friction member 210.

Gear teeth of the gears 142, 144, and 146 constituting the planetary gear module 140 may be formed of a helical gear.

The helical gear has a shape in which a tooth trace is obliquely inclined. The helical gear is a cylindrical gear, the tooth trace of which is a spiral curve, and the relative positions of two axes are parallel like a spur gear. Since the helical gear has the length of a contact line longer than that of the spur gear, the helical gear may transfer large force, and noise is low because the helical gear rotates smoothly. The helical gear is mainly used for general transfer devices or reducers.

However, it is difficult to manufacture the helical gear and a sawtooth of the helical gear is inclined so that thrust is applied in an axial direction. When the helical gear is viewed from the axial direction, if the tooth trace is right-handed, this is called right twist and, if the tooth trace is left-handed, this is called left twist.

As described above, when the shape of the gear teeth is formed of the helical gear, thrust is generated when the gears 142, 144, and 146 rotate, and there are problems in that collision occurs between a lifting component reciprocating in a vertical direction by thrust and a fixing component maintaining a relatively fixed state, and impact noise and vibration, and deformation and damage of the parts occur.

For example, when thrust is generated by rotation of the helical gear, the lower washing shaft 115 forming one body with the sun gear 144 reciprocates in a vertical direction, whereas the lower dewatering 125 maintains a fixed state. In this case, collision occurs between the fixing ring 220 fixed to the lower washing shaft 115 that performs an ascending and descending operation and the anti-friction member 210 fixed to the lower dewatering shaft 125 that maintains a fixed state, thereby causing noise and damaging and deforming the fixing ring 220 or the anti-friction member 210.

Therefore, it is necessary to additionally provide a separate means for reducing noise caused by collision between the anti-friction member 210 and the fixing ring 220 and alleviating impact when thrust is generated.

In order to solve the above-mentioned problems, a wave washer 230 having a cushioning function may be inserted between the anti-friction member 210 and the fixing ring 220 in order to reduce noise and impact caused by collision between the anti-friction member 210 and the fixing ring 220, which is generated by relative motion of the lower washing shaft 115 and the lower dewatering shaft 125.

When viewed from an axial direction, the wave washer forms a closed curve such as a circle and, when viewed from a direction perpendicular to the axial direction, the wave washer has a shape bent in a waveform.

The wave washer 230 configured as described above provides elasticity in the axial direction. Accordingly, thrust generated in the axial direction may be attenuated by the wave washer 230. In addition, impact and noise caused by collision between the anti-friction member 210 and the fixing ring 220 may be reduced.

In this embodiment, in adopting the wave washer 230, when the wave washer 230 having greater elastic restoring force or elastic modulus K than thrust is adopted, collision between the anti-friction member 210 and the fixing ring 220 may be perfectly prevented.

For reference, the "elastic restoring force" or "elastic modulus K" may be selected within a range that may be restored to an original state after being deformed by thrust without damaging the wave washer 230 due to thrust. The "elastic restoring force" or "elastic modulus K" may be variously changed depending on the thickness, width, diameter, material, bent shape, and height of the wave washer 230. Here, the height of the wave washer 230 may mean a phase difference between the uppermost end and the lowermost end of the wave washer 230 in the axial direction.

As described above, when only the wave washer 230 is inserted between the anti-friction member 210 and the fixing ring 220, if a product is dropped in a situation such as product packaging or product installation, huge impact may inevitably occur. In addition, as the lower washing shaft 115 moves in the axial direction due to such impact, plastic deformation or damage of the wave washer 230 may occur, or impact noise caused by collision between the anti-friction member 210 and the fixing ring 220 and damage of the anti-friction member 210 and the fixing ring 220 may occur.

In order to solve the above problems, a washer housing 240 for accommodating the wave washer 230 may be further inserted between the anti-friction member 210 and the fixing ring 220 in order to alleviate instantaneous impact that may be applied to the wave washer 230 during product packaging or installation, alleviate load repeatedly applied to the wave washer 230 due to thrust, and, at the same time, improve a repeated fatigue life of the wave washer 230.

Similar to the shape of the wave washer 230, when viewed from the axial direction, the washer housing 240 also forms a closed curve such as a circle and, when viewed from a direction perpendicular to the axial direction, the washer housing 240 has a shape bent in a waveform.

Hereinafter, a coupling structure of the wave washer 230 and the washer housing 240 will be described in more detail with reference to the drawings.

Figure 13:
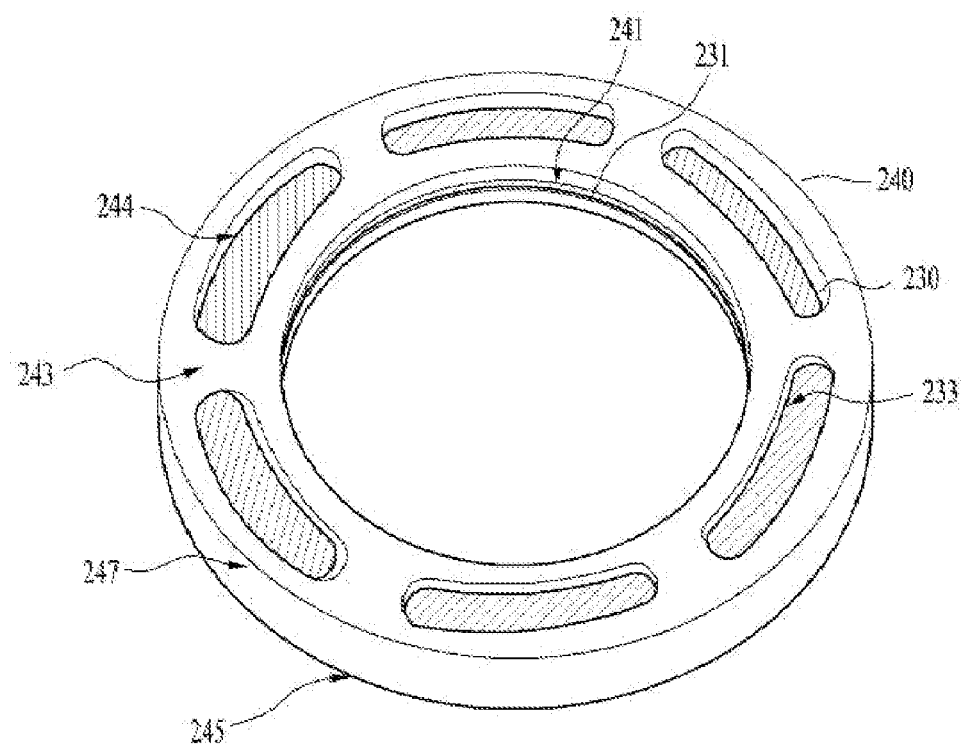
FIGS. 13 and 14 are perspective views for explaining a wave washer and a washer housing, respectively.
Figure 14:
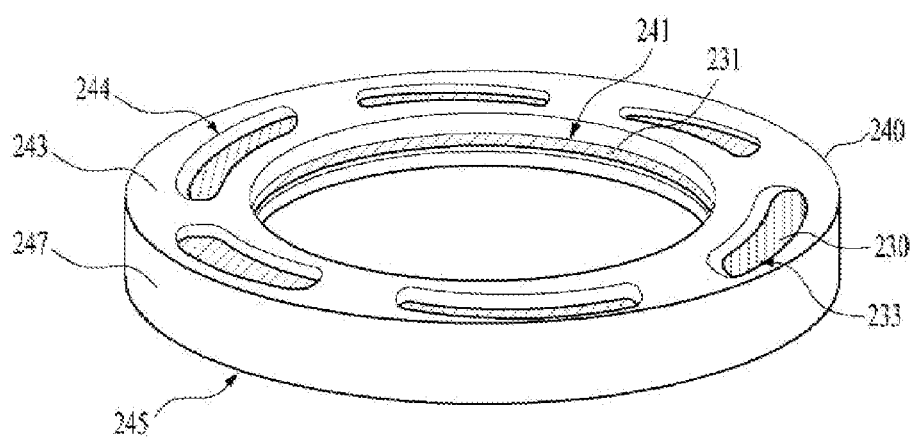

FIGS. 13 and 14 are perspective views for explaining a wave washer and a washer housing, respectively.

Referring to FIGS. 13 and 14, the wave washer 230 may be accommodated in the washer housing 240.

More specifically, the washer housing 240 includes a first portion 243 which is in contact with the anti-friction member 210, a second portion 245 which is in contact with the fixing ring 220, and a connection portion 247 which connects a first portion 243 and the second portion 245 and covers an outer circumferential surface of the wave washer 230.

In this case, the wave washer 230 is accommodated in the washer housing 240 and may be in close contact with an inner surface of the washer housing 240.

More specifically, a surface (hereinafter, referred to as a first surface 233) facing the anti-friction member 210 of the wave washer 230 is covered by the first portion 243 of the washer housing 240 and may be coupled to be in close contact with an inner side surface of the first portion 243. A surface (hereinafter, referred to as a second surface) facing the fixing ring 220 of the wave washer 230 is covered by the second portion 245 and may be coupled to be in close contact with an inner side surface of the second portion 245. The outer circumferential surface of the wave washer 230 is covered by the connection portion 247 of the washer housing 240 and may be coupled to be in close contact with an inner side surface of the connection portion 247. That is, the wave washer 230 may contact each of the first portion 243, the second portion 245, and the connection portion 247 of the washer housing 240.

In exemplary embodiments, the first surface 233 of the wave washer 230 may be partially covered by the first portion 243 of the washer housing, and the second surface of the wave washer 230 may be partially covered by the second portion 245 of the washer housing. In one embodiment, the outer circumferential surface of the wave washer 230 may be fully covered by the connection portion 247 of the washer housing.

Meanwhile, the washer housing 240 may further include a washer exposing portion 241 which is provided on an inner circumferential surface of the washer housing 240 and exposes an inner circumferential surface 231 of the wave washer 230. Therefore, unlike the outer circumferential surface of the wave washer 230 which is covered by the connection portion 247 of the washer housing 240 and is not exposed, the inner circumferential surface 231 of the wave washer 230 may be exposed by the washer exposing portion 241 of the washer housing 240.

In addition, the first portion 243 and the second portion 245 of the washer housing 240 may include a first opening 244 and a second opening, respectively.

Accordingly, a portion of the first surface 233 of the wave washer 230 may be exposed to the anti-friction member 210 by the first opening 244, and a portion of the second surface of the wave washer 230 may be exposed to the fixing ring 220 by the second opening.

In exemplary embodiments, each of the first opening 244 and the second opening may be formed of a plurality of openings. In one embodiment, the first opening 244 and the second opening may be formed of the same number of openings and may be formed at positions corresponding to each other.

The wave washer 230 and the washer housing 240 may be made of different materials.

In one embodiment, the washer housing 240 may be formed of a poly material, for example, a plastic material such as polycarbonate. In addition, the washer housing 240 may be formed of various materials having a buffer function.

As described above, when the washer housing 240 is additionally inserted, abrasion and damage of a part intensively receiving intensive load when the fixing ring 220 and the wave washer 230 are in contact with each other may be prevented. In addition, the fatigue life of the wave washer 230 may be increased. Further, instantaneous impact that may be applied to the wave washer 230 during product packaging or installation may be alleviated, so that plastic deformation or breakage of the wave washer 230 may be prevented.

Unlike a conventional auxiliary washer disposed at each of upper and lower portions of the wave washer 230, since the washer housing 240 covers all of the first surface 233, the second surface, and the outer circumferential surface of the wave washer 230, the coupling stability and reliability of the wave washer 230 may be improved.

In addition, even when a large impact is applied to the wave washer 230, the wave washer 230 may remain inside the washer housing 240 without being separated from the washer housing 240, so that noise generated while the damaged wave washer 230 contacts the fixing ring 220 or the anti-friction member 210 may be reduced.

Referring to FIGS. 13 and 14 and FIGS. 10 to 12, when product packaging or installation is performed, if the wave washer 230 and the washer housing 240 are deformed by a reference value or more, a lower end of the lower dewatering shaft 125 is formed at a center portion of the rotor 190 and contacts an upper end of the shaft coupling boss 197 to which the lower washing shaft 115 is fitted.

Here, the "reference value" may mean the degree of deformation of the wave washer 230 and the washer housing 240 when load corresponding to a maximum value of allowable load is applied to the wave washer 230 and the washer housing 240.

As described above, when the wave washer 230 and the washer housing 240 are deformed by more than the reference value, if the lower end of the lower dewatering shaft 125 first contacts the upper end of the shaft coupling boss 197, the wave washer 230 and the washer housing 240 may be prevented from being plastically deformed, and the anti-friction member 210 may be prevented from being damaged by impact while a lower end of the anti-friction member 210 is in contact with the upper end of the shaft coupling boss 197.

Specifically, when load corresponding to a maximum value of allowable load is applied, impact may be primarily alleviated while the washer housing 240 is first deformed. Next, impact may be secondarily alleviated while the wave washer 230 is deformed. Then, impact may be tertiarily alleviated while the lower end of the lower dewatering shaft 125 is in contact with the upper end of the shaft coupling boss 197.

As described above, if drop impact is alleviated through multiple steps, impact applied finally to the anti-friction member 210 may be minimized, and the anti-friction member 210 may be prevented from being damaged by impact generated during product packaging or installation.

The laundry treatment apparatus according to exemplary embodiments of the present disclosure is advantageous in that a washing shaft may be firmly fixed to the inside of a dewatering shaft, and the rotation of the washing shaft alone may be smoothly and stably performed while the dewatering shaft is fixed.

In addition, since a sun gear and a lower washing shaft are integrally formed, a power transmission rate may be further improved.

In addition, due to thrust generated in an axial direction, impact and noise generated while a fixing ring fixed to the washing shaft and an anti-friction member fixed to the dewatering shaft collide with each other may be effectively reduced.

Additionally, when a wave washer having allowable load greater than thrust is applied, collision between the anti-friction member and the fixing ring may be perfectly prevented.

In addition, when the fixing ring and the wave washer, or the wave washer and the anti-friction member are repeatedly contacted, abrasion of a part intensively receiving load may be prevented, and a fatigue life of the wave washer may be increased.

In addition, plastic deformation or breakage of the wave washer may be prevented by alleviating instantaneous impact that may be applied to the wave washer during product packaging or installation.

In addition, even if the wave washer is damaged, the wave washer is not arbitrarily separated and remains in a washer housing, and noise generated while the damaged wave washer contacts the fixing ring or the anti-friction member may be reduced.

In addition, when the wave washer and the washer housing are deformed by a reference value or more, a lower end of the lower dewatering shaft first contacts an upper end of a shaft coupling boss, and a lower end of the anti-friction member contacts the upper end of the shaft coupling boss, thereby preventing the anti-friction member from being damaged by impact.

While various embodiments of the present disclosure haven been described in detail, it will be understood by those skilled in the art that various modifications and variations may be made in the present disclosure without departing from the spirit or scope of the disclosure. Accordingly, the scope of the present disclosure should not be limited to the embodiments described and should be determined by the appended claims and their equivalents.

What is claimed is:

1. A laundry treatment apparatus comprising:
a case;
a tub disposed inside the case and configured to accommodate washing water;
a drum rotatably disposed inside the tub and configured to accommodate laundry;

a pulsator disposed inside the drum and configured to rotate based on receiving driving force; and
a driver configured to supply the driving force for rotating the drum and the pulsator,
wherein the driver comprises:
a driving motor comprising a stator and a rotor,
a bearing housing disposed at a lower portion of the tub,
a dewatering shaft having a lower end disposed adjacent to the rotor and an upper end connected to the drum, the dewatering shaft defining a through-hole therein,
a coupler configured to selectively connect the dewatering shaft to the rotor based on moving upward and downward along an outer circumferential surface of the dewatering shaft,
a washing shaft disposed inside the through-hole of the dewatering shaft and configured to rotate the pulsator, the washing shaft having a lower end connected to the rotor and an upper end connected to the pulsator, and
an anti-friction member disposed between the dewatering shaft and the washing shaft,
wherein the washing shaft defines a fixing groove that is recessed inward from an outer circumferential surface of the washing shaft and extends along a circumferential direction,
wherein the driver further comprises:
a fixing ring disposed in the fixing groove, wherein an outer circumferential surface of the fixing ring radially protrudes outward relative to the outer circumferential surface of the washing shaft,
a washer housing disposed between the anti-friction member and the fixing ring, and
a wave washer accommodated inside the washer housing, and
wherein the washer housing is disposed at the lower end of the dewatering shaft, and the fixing ring is disposed vertically below the washer housing.

2. The laundry treatment apparatus of claim 1, wherein the washer housing covers an outer circumferential surface of the wave washer.

3. The laundry treatment apparatus of claim 1, wherein the washer housing comprises:
a first portion in contact with the anti-friction member,
a second portion in contact with the fixing ring, and
a connecting portion that connects the first portion to the second portion and covers an outer circumferential surface of the wave washer.

4. The laundry treatment apparatus of claim 3, wherein the wave washer is in contact with an inner surface of each of the first portion, the second portion, and the connecting portion of the washer housing.

5. The laundry treatment apparatus of claim 3, wherein the first portion of the washer housing covers at a least a portion of a first surface of the wave washer facing the anti-friction member, and
wherein the second portion of the washer housing covers at least a portion of a second surface of the wave washer facing the fixing ring.

6. The laundry treatment apparatus of claim 5, wherein the first portion of the washer housing defines a first opening that exposes a portion of the first surface of the wave washer to the anti-friction member, and
wherein the second portion of the washer housing defines a second opening that exposes a portion of the second surface of the wave washer to the fixing ring.

7. The laundry treatment apparatus of claim 6, wherein the first opening is one of a plurality of first openings defined at the first portion of the washer housing, and
wherein the second opening is one of a plurality of second openings defined at the second portion of the washer housing.

8. The laundry treatment apparatus of claim 7, wherein a number of the plurality of first openings is equal to a number of the plurality of second openings, and
wherein a position of each of the plurality of first openings corresponds to a position of one of the plurality of second openings.

9. The laundry treatment apparatus of claim 3, wherein the washer housing further defines a washer exposing space at an inner circumferential surface of the washer housing, and
wherein an inner circumferential surface of the wave washer is exposed to the washing shaft through the washer exposing space of the washer housing.

10. The laundry treatment apparatus of claim 1, wherein the wave washer and the washer housing are made of different materials from each other.

11. The laundry treatment apparatus of claim 1, wherein the anti-friction member comprises a bearing.

12. The laundry treatment apparatus of claim 1, wherein the washing shaft comprises an upper washing shaft and a lower washing shaft that are arranged along an axial direction, the lower washing shaft being disposed vertically below the upper washing shaft, and
wherein the anti-friction member is disposed between an outer circumferential surface of the lower washing shaft and an inner circumferential surface of the dewatering shaft.

13. The laundry treatment apparatus of claim 1, wherein the wave washer has a circular shape surrounding the washing shaft.

14. The laundry treatment apparatus of claim 13, wherein at least one of a top surface of the wave washer or a bottom surface of the wave washer defines a waveform that protrudes upward or downward.

15. The laundry treatment apparatus of claim 14, wherein the washer housing has a shape corresponding to the waveform of the wave washer.

16. The laundry treatment apparatus of claim 14, wherein an upper surface of the washer housing is in contact with the anti-friction member, and
wherein a lower surface of the washer housing is in contact with the fixing ring.

17. The laundry treatment apparatus of claim 16, wherein the upper surface of the washer housing defines a plurality of first openings that are arranged along the circumferential direction, each of the plurality of first openings having an elongated shape in the circumferential direction,
wherein the lower surface of the washer housing defines a plurality of second openings that are arranged along the circumferential direction, each of the plurality of second openings having the elongated shape in the circumferential direction, and
wherein the wave washer is exposed to an outside of the washer housing through the plurality of first openings and the plurality of second openings.

18. The laundry treatment apparatus of claim 17, wherein a number of the plurality of first openings is equal to a number of the plurality of second openings.

19. The laundry treatment apparatus of claim 17, wherein the washer housing further defines a washer exposing space at an inner circumferential surface of the washer housing, and wherein an inner circumferential surface of the wave washer is exposed to the washing shaft through the washer exposing space of the washer housing.

20. A laundry treatment apparatus comprising:

a case;

a tub disposed inside the case and configured to accommodate washing water;

a drum rotatably disposed inside the tub and configured to accommodate laundry;

a pulsator disposed inside the drum and configured to rotate based on receiving driving force; and a driver configured to supply the driving force for rotating the drum and the pulsator, wherein the driver comprises:

a driving motor comprising a stator and a rotor, a bearing housing disposed at a lower portion of the tub, a dewatering shaft having a lower end disposed adjacent to the rotor and an upper end connected to the drum, the dewatering shaft defining a through-hole therein, a coupler configured to selectively connect the dewatering shaft to the rotor based on moving upward and downward along an outer circumferential surface of the dewatering shaft, a washing shaft disposed inside the through-hole of the dewatering shaft and configured to rotate the pulsator, the washing shaft having a lower end connected to the rotor and an upper end connected to the pulsator, and an anti-friction member disposed between the dewatering shaft and the washing shaft, wherein the washing shaft defines a fixing groove that is recessed inward from an outer circumferential surface of the washing shaft and extends along a circumferential direction, wherein the driver further comprises:

a fixing ring disposed in the fixing groove, wherein an outer circumferential surface of the fixing ring radially protrudes outward relative to the outer circumferential surface of the washing shaft, a washer housing disposed between the anti-friction member and the fixing ring, and a wave washer accommodated inside the washer housing, and wherein the washer housing comprises:

a first portion in contact with the anti-friction member, a second portion in contact with the fixing ring, and a connecting portion that connects the first portion to the second portion and covers an outer circumferential surface of the wave washer.

* * * * *